United States Patent [19]

Ste. Marie

[11] Patent Number: 4,979,307

[45] Date of Patent: Dec. 25, 1990

[54] ROTARY CUTTER TOOL

[76] Inventor: Ray M. Ste. Marie, 16532 Stent Rd., Jamestown, Calif. 95327

[21] Appl. No.: 375,268

[22] Filed: Jun. 30, 1989

[51] Int. Cl.$^5$ .................. B23D 45/24; B23D 45/00; B23D 45/20; B23D 57/00

[52] U.S. Cl. .................................. 30/388; 30/166.3; 30/379; 30/382

[58] Field of Search .................. 30/90, 3, 166, 144, 30/278, 347, 379, 388, 371, 382; 7/13; 33/202; 144/8, 18, 35, 39; 29/69; 83/472, 477

[56] References Cited

U.S. PATENT DOCUMENTS

| | | | |
|---|---|---|---|
| 2,176,646 | 10/1939 | Thatcher | 29/69 |
| 2,490,255 | 12/1949 | Chase | 30/371 |
| 3,453,917 | 7/1969 | Perry | 83/454 |
| 3,614,904 | 10/1971 | Young et al. | 81/9.5 |
| 3,878,876 | 4/1975 | Abel | 30/166.3 |
| 3,881,615 | 5/1975 | Albright | 30/379 |
| 3,991,470 | 11/1976 | Cartmill | 30/382 |
| 4,143,460 | 3/1979 | Shean | 30/382 |

*Primary Examiner*—Douglas D. Watts
*Assistant Examiner*—Paul M. Heyrana
*Attorney, Agent, or Firm*—Glenn D. Bellamy

[57] ABSTRACT

Provided is a rotary cutting tool for cutting elongated objects such as electrical cable armor. The tool includes a frame or yoke with a rotary cutting element supported thereon. A pair of spaced-apart workpiece-contacting elements or guide members are supported on the frame and positioned on opposite sides of the cutting element to make contact with spaced-apart portions of an elongated workpiece radially outwardly of the cutting element's cutting edge. The workpiece-contacting elements are yieldable toward the cutting edge to an extent sufficient to allow relative movement of the cutting edge into cutting contact with the workpiece and to thereby guide and brace the workpiece against substantially tangential movement relative to the rotary cutting element.

14 Claims, 3 Drawing Sheets

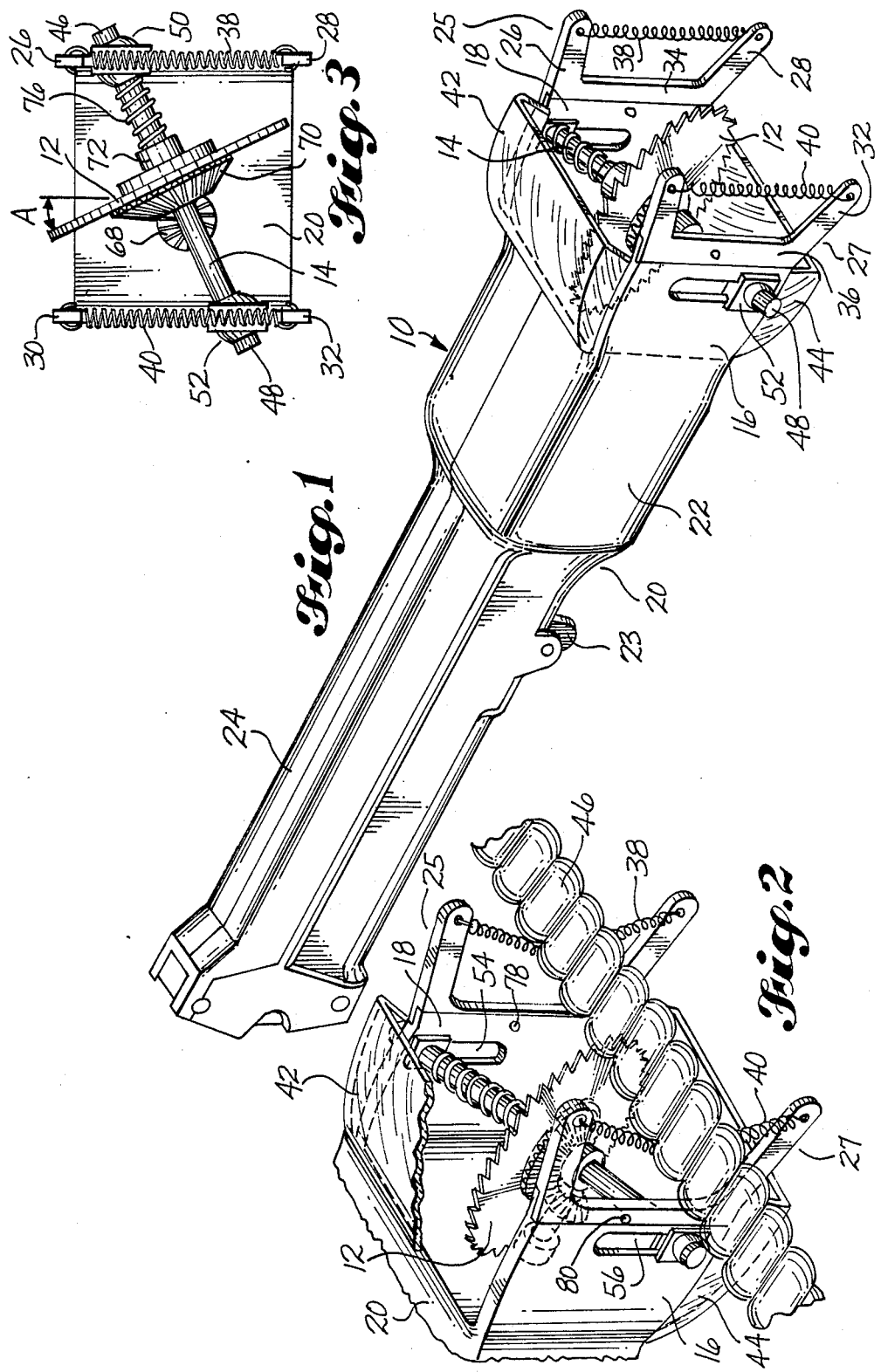

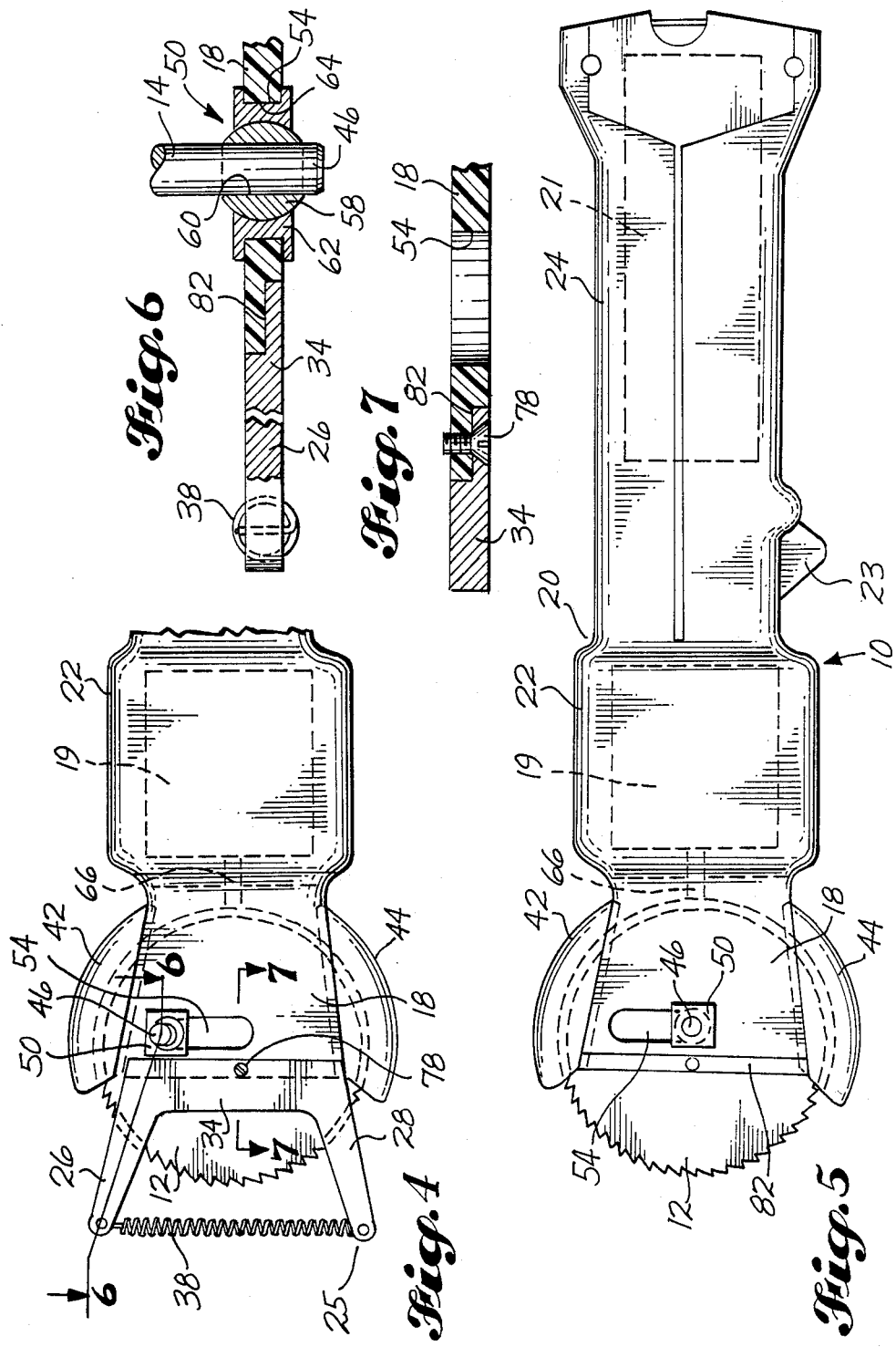

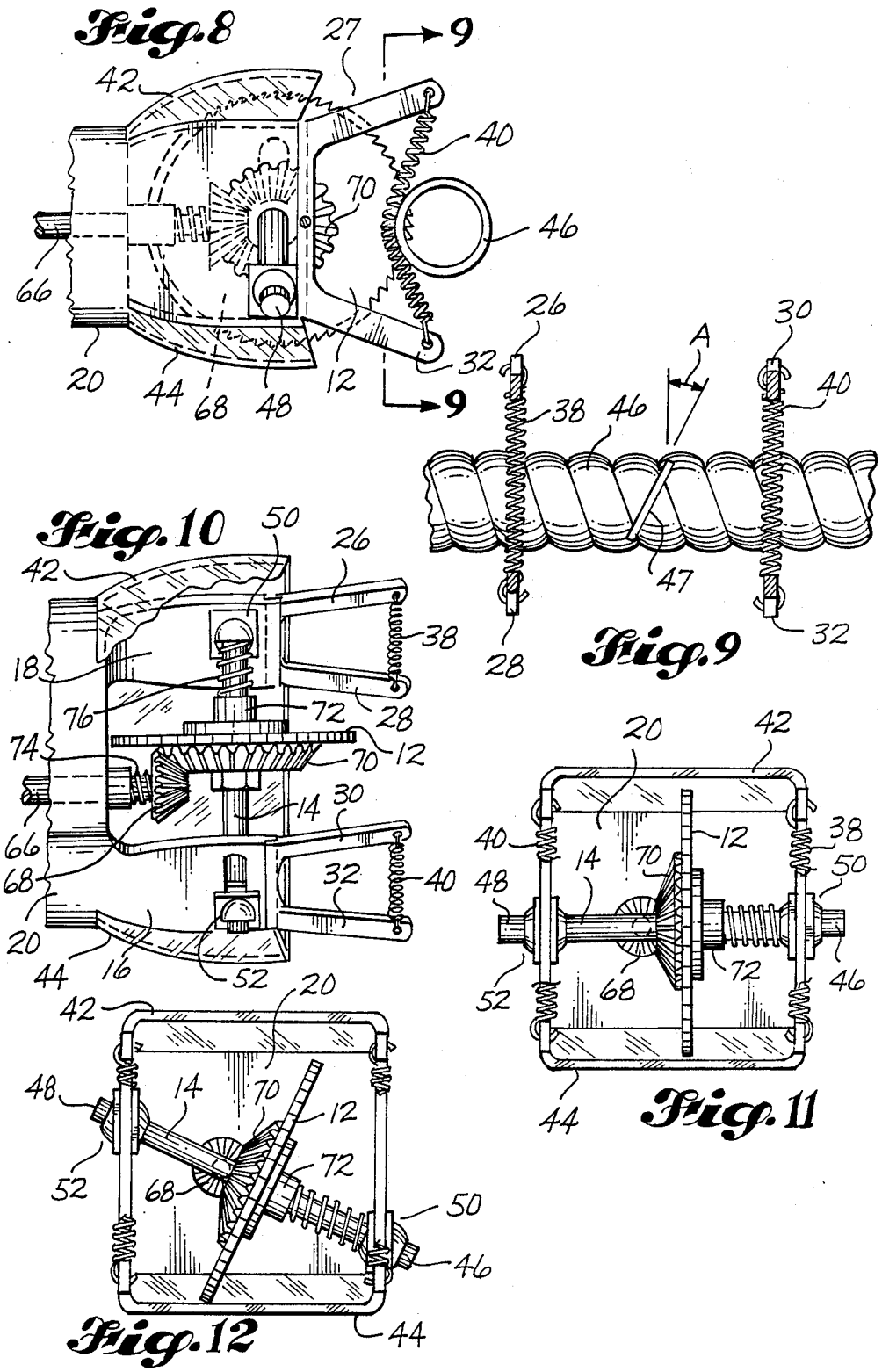

ROTARY CUTTER TOOL

TECHNICAL FIELD

This invention relates to a rotary cutting tool particularly adapted to easily cut "BX"- or "FLEX"-type spirally-wound electrical cable armor or other elongated articles.

BACKGROUND ART

According to many local building codes, electrical wiring which is not enclosed within a building's walls must be protected in an armored sheath. This is normally done by running the wire through either a relatively rigid, although shapable, metallic conduit or by encasing the wire in a flexible armor sheath. This flexible armor sheath is commonly referred to as "BX", which is supplied with the necessary wire conductors already encased therein, or "FLEX", which is a flexible armor sheath into which the necessary wires are introduced on site. Most commonly, these flexible armor sheaths are constructed of a helically-wound metallic, or reinforced nonmetallic, material. Because of its helical construction, such an armor sheath is difficult to cut with ordinary tools.

Various tools, such as those shown in U.S. Pat. Nos. 2,176,646 and 3,453,917, have been designed to provide a longitudinal cut along such helically-wound cable armor. C. A. Thatcher (U.S. Pat. No. 2,176,646) discloses a tool for clamping cable armor in place and providing a longitudinal cut in the sheath. This device is relatively large and is cumbersome for a worker to carry while on a jobsite. It is also too large to conveniently be used in close quarters.

F. J. Perry (U.S. Pat. No. 3,453,917) shows a rotary cutter for flexible cable armor which clamps the sheath into place and creates a longitudinal cut.

Each of the above-described devices is limited to a specific use and does not allow the user to select the angle at which the sheath is cut. Despite the disclosure of these prior art devices, the heretofore most common method of cutting such cable armor is with an ordinary hack saw. The cable sheath is held in one hand while the other hand directs the saw diagonally across a helical strand of the sheath until it is completely cut through one turn of the helix. The sheath is then bent away from the cut line to separate the helical turns. Although a hack saw has a wide variety of alternative uses, it is still relatively large to be carried on a worker's tool belt and can be difficult to use in the close quarters. Also, this method of cutting is slow and fatiquing to the worker. The hack saw blade is prone to slipping from its position on the sheath, resulting in a jagged cut edge or injury to the worker's fingers.

DISCLOSURE OF THE INVENTION

The present invention provides a cutting tool with a rotary cutting element operably supported on a frame. The cutting element rotates about an axis to present a peripheral cutting edge. A pair of spaced-apart workpiece-contacting elements are supported by the frame and positioned on opposite sides of the cutting element, substantially axially spaced therefrom. The workpiece-contacting elements make contact with spaced-apart portions of an elongated workpiece radially outwardly of the cutting edge. The workpiece-contacting elements are yieldable toward the cutting edge to an extent sufficient to allow relative movement of the cutting edge into cutting contact with the workpiece while the workpiece-contacting elements remain in contact with the workpiece.

The workpiece contacting elements may be in the form of a pair of spaced-apart forks. Each fork includes a base and a pair of tines extending from the base. Each tine has an outer end portion such that a space is defined between each pair of tines. The tines project from the base a distance sufficient to position end portions of the tines outward of the rotary cutting element's rotary cutting edge. A pair of yieldable guide members, each of which spans between the tines of a fork, are placed against spaced-apart portions of an elongated workpiece and are yieldable to an extent sufficient to permit relative movement of the cutting element into cutting contact with the workpiece. The yieldable guide members remain in contact with the workpiece as it is cut and brace the workpiece against movement which is substantially tangential to the cutting element.

The axis of the rotary cutting element may be adjustable relative to the workpiece-contacting elements or guide members to provide the workpiece with a substantially transverse or slightly oblique cut. The outwardly-extending tines or workpiece-contacting elements normally protect the rotary cutting element from inadvertent contact with other objects or surfaces.

It is an object of this invention to provide a hand-held, multipurpose cutting tool which can be conveniently carried by a worker and safely used, even in close quarters.

It is also an object of this invention to provide a rotary cutting tool for cutting elongated objects, such as armored cable sheath, without the necessity of engaging the article in a clamping mechanism. The present invention provides a guide means which facilitates the positioning of elongated articles to be moved into cutting contact with the rotary cutting element.

BRIEF DESCRIPTION OF THE DRAWING

Like reference numerals are used to designate like parts throughout the various figures of the drawing, and:

FIG. 1 is a pictorial view of the cutting tool according to the preferred embodiment of the invention;

FIG. 2 is a fragmentary enlarged view of a cutter head portion of the tool, shown engaging a portion of electrical cable armor;

FIG. 3 is an end view of the cutting tool showing the blade in a first angled position;

FIG. 4 is a fragmentary side view of the tool showing the cutter wheel in the first angled position;

FIG. 5 is a side view similar to FIG. 4, showing the cutter wheel in a straight position and with the guide forks removed;

FIG. 6 is a view taken substantially along lines 6—6 of FIG. 4, showing the attachment of a presser spring on a fork and a cross-section of a ball bushing with a portion of the cutter axle extending therethrough;

FIG. 7 is a sectional view taken substantially along line 7—7 of FIG. 4, showing the attachment of a guide fork to a support member;

FIG. 8 is a side view of the tool's cutter head with an angled cutter wheel shown engaging a section of cable armor;

FIG. 9 is a sectional view taken substantially along line 9—9 of FIG. 8, showing a portion of cable armor cut according to the engagement shown in FIG. 8;

FIG. 10 is a fragmentary, angled side view showing the drive engagement of bevel gears;

FIG. 11 is a front view similar to FIG. 3, in which the cutter wheel is shown in a straight position; and FIG. 12 is an end view similar to FIGS. 3 and 11, wherein the cutter wheel is shown in a second angled position.

BEST MODE FOR CARRYING OUT THE INVENTION

Referring to the various figures of the drawing, and first to FIG. 1, therein is shown at 10 a cutting tool according to the preferred embodiment of the invention. The cutting tool 10 includes a rotary cutting element in the form of a circular blade 12 rotatably mounted on an axle 14. The axle 14 extends between opposite side portions 16, 18 of a support frame or yoke.

The side portions 16, 18 of the frame extend forwardly in a substantially parallel direction from the tool body 20. The tool body 20 includes a motor housing 22 and a battery housing 24 which also serves as a grip handle. An electric motor 19 which is powered by a rechargeable battery pack 21 and is operated by a trigger switch 23 is the preferred means for rotatably driving the blade 12. A preferred drive connection will be further described in detail later.

Referring now also to FIGS. 2, 4, 8 and 10, each side portion 16, 18 is provided with a fork 25, 27 which includes a pair of outwardly-extending tines 26, 28, 30, 32. Each pair of tines extends from a base portion 34, 36 which is part of, or attached to, the side portions 16, 18. The side portions 16, 18 and forks 25, 27 are spaced apart substantially axially from the cutting blade 12. Extending between each pair of tines 26, 28, 30, 32 are resiliently yieldable guide members. In preferred form, these yieldable guide members are coil springs 38, 40 having ends attached to outward end portions of the tines 26, 28, 30, 32.

As shown in FIGS. 4 and 8, the forks 25, 27 project outwardly beyond the cutting edge of the blade 12. In this manner, the blade 12 is normally substantially protected from inadvertent contact with other objects or surfaces. The forks 25, 27 are set wide enough to shield the blade not only forwardly but also on top and bottom sides. Rear blade shields 42, 44, which are preferably constructed from transparent material, may be provided to further protect the hands and eyes of the worker using the tool 10.

In use, an elongated workpiece 46 is positioned to extend substantially parallel to the axis 14 between respective pairs of tines 26, 28, 30, 32 and against the resiliently yieldable guide members (springs 38, 40). The tool 10 is then moved toward the workpiece 46, deflecting the guide springs 38, 40 until the blade 12 comes into cutting contact with the workpiece 46. The springs 28, 40 resiliently bend and stretch to substantially conform with the shape of the workpiece 46 and to provide a "bed" or bight against which the workpiece 46 rests so that the workpiece 46 will resist tangential movement relative to and caused by the rotating cutting blade 12. A "cradling" effect created by the resilient guide members 38, 40 also facilitates proper alignment of the workpiece 46 relative to the cutting blade 12.

Accordingly to one aspect of the invention, the angle at which the cutting element 12 contacts the workpiece 46 may be adjusted to be either perpendicular or angled to provide either a transverse or an oblique cut in the workpiece 46. Normally, when the workpiece 46 is "BX" or "FLEX" helically-wound flexible cable armor, the cutting blade 12 is positioned to contact the workpiece 46 slightly angled from perpendicular. The tool 10 is illustrated with the cutting blade 12 in this position in FIGS. 1–4, 8 and 10. This angle, shown as "A" in FIGS. 3 and 9, provides a cut 47 substantially across a single turn of the helically-wound sheath 46. Angle A represents the degree to which the axis of the cutting blade 12 is rotated from perpendicular relative to the direction of the side portions 16, 18, forks 25, 27, and guide springs 38, 40. This angle A is typically approximately 25°. If the tool 10 is to be used only for cutting the above-described type of workpiece 46, the axle 14 may be permanently secured in this position relative to the guide means. However, to make the tool 10 usable for a plurality of cutting purposes, the axle 14 may be constructed to be adjustably positioned between the side portions 16, 18.

The preferred means for adjusting the angle of the cutting blade 12 is to support opposite end portions 46, 48 of the axle 14 in floating bearings 50, 52 which are slidably positionable along slots 54, 56 formed in the opposite side portions 16, 18.

Referring now to FIG. 6, each floating bearing 50, 52 is in the form of a ball bushing 58 having a central bore 60 through which an end portion 46 of the axle 14 extends. The ball bushing 58 is captured in a socket 62. The socket 62 is notched (at 64) to be slidably held within the slot 54, 56. The floating bearing 50, 52 may be infinitely positionable along the length of the slot 54, 56 or may also be releasably held at definite positions, such as at extreme opposite ends, along the slot 54, 56 by detents (not shown), or the like.

The illustrated embodiment includes slots 54, 56 which extend from a central, aligned position to oppositely-directed positions. This allows the axle 14 and blade 12 to be positioned as shown in FIGS. 3 and 11, and infinitely therebetween. If desired, the slots 54, 56 may extend in both directions from a central location to allow the axle 14 and blade 12 to be angled in the opposite direction, as shown in FIG. 12. Such an angle would not be desirable for cutting BX or FLEX but could be desirable for other cutting purposes.

In preferred form, the circular cutting blade 12 is driven by a battery-powered electric motor 19 having a drive shaft 66 which extends substantially perpendicular to the axle 14 and axis of the cutting blade 12. The drive energy is transferred to the cutting wheel 12 through a pair of complementary bevel gears 68, 70. The driven gear 70 is mounted along with the cutting blade 12 on a hub or bearing 72. In this embodiment, the axle 14 is fixed in place and the bearing 72, along with driven gear 70 and cutting blade 12, rotate thereon. The bevel gears are held into intermeshing contact by coil springs 74, 76. In this manner, drive gear 68 is relatively fixed in place while driven gear 70 is longitudinally positionable along the axle 14. This allows the driven gear 70 to align itself against the drive gear 68 as the axle 14 is adjusted in position from that shown in FIG. 11 to that shown in either of FIGS. 3 or 12. Gearing ratios may be selected as necessary to provide proper power and speed. It is preferred that the electric motor 19 is selected to rotate at approximately 2,700–3,000 rpm. The cutting blade 12 is selected to operate at variable high speeds.

According to another aspect of the invention, the forks 25, 27 may be removable to allow varied uses of the cutting tool 10. In preferred form, each fork 25, 27, including its respective tines 26, 28, 30, 32 and presser spring 38, 40, is attached to the side portion 16, 18 of the support frame by screws 78, 80. The base portions 34, 36 of the forks 25, 27 are provided with a groove 82 which mates with a corresponding groove on the outward edge of the side portions 16, 18 of the frame. This provides a detachable, but rigid, connection between the members. The forks 25, 27 may also be moved to expose the cutting blade 12 in other manners (not shown) such as providing a hinge connection between the forks 25, 27 and respective side portions 16, 18 of the frame, or by pivotally connecting the tines 26, 28, 30, 32 to their respective base portions 34, 36. Without the protective extensions of the tines 26, 28, 30, 32, the cutting blade 12 may be exposed for use in close quarters or for cutting sheet materials. The cutting blade 12 may be interchangeable as needed to cut wood, metal, plastic, or other materials.

It is to be understood that the aspects and features of this invention may be practiced in many forms other than the preferred, illustrated embodiment. Therefore, my patent protection is to be measured and limited only by the appended claim or claims, interpreted according to accepted doctrines of claim interpretation, including the doctrine of equivalents.

What is claimed is:

1. A cutting tool, comprising:
   a frame;
   a rotary cutting element supported on said frame for rotation about an axis, and including a peripheral cutting edge;
   a rotary drive connected to said cutting element;
   a pair of spaced-apart workpiece-contacting guide elements supported by the frame and positioned on substantially axially opposite sides of the cutting element to make contact with spaced-apart portions of an elongated workpiece radially outwardly of said cutting edge; and
   said workpiece-contacting guide elements being yieldable toward the cutting edge to an extent sufficient to allow relative movement of the cutting edge into cutting contact with the workpiece while the workpiece-contacting elements are in contact with the workpiece and said workpiece-contacting guide elements being positioned to guide said workpiece into alignment with said cutting edge.

2. The cutting tool according to claim 1, wherein spaced-apart yieldable workpiece-contacting guide elements are positioned to guide said cutting edge into cutting contact with the workpiece such that said workpiece is obliquely cut.

3. The cutting tool according to claim 1, wherein said workpiece-contacting guide elements each have a yieldable central portion which substantially conforms to the shape of the workpiece as the cutting edge is moved into cutting contact with the workpiece.

4. A cutting tool, comprising:
   a pair of spaced-apart forks, each fork including a base and a pair of tines extending from said base;
   each said pair of tines defining a space between them;
   each said tine having an outer end portion;
   an axle extending between said bases and having opposite ends which are supported by said bases;
   a rotary cutting element mounted on said axle between said forks, said cutting element having a peripheral cutting edge and being rotatably driven by a drive motor;
   said tines projecting from said bases a distance sufficient to place the end portions of the tines outward of said cutting edge;
   a pair of yieldable guide members, each said guide member spanning between the tines of a said fork and having end portions connected to the end portions of such tines;
   wherein in use said yieldable guide members are placed against spaced-apart portions of an elongated workpiece; and
   said yieldable guide members being yieldable to an extent sufficient to permit relative movement of the cutting element into cutting contact with said workpiece with said yieldable guide members remaining in contact with said workpiece and said yieldable guide members and said tines bracing said workpiece against movement substantially tangential to said rotary cutting element.

5. The cutting tool according to claim 4, wherein said yieldable guide members are made of a resiliently-elastic material.

6. The cutting tool according to claim 4, wherein said yieldable guide members include coil springs.

7. The cutting tool according to claim 4, wherein each of said forks is movable to a position wherein said end portions of said tines are positioned radially inwardly of said cutting edge such that said cutting element is substantially exposed.

8. The cutting tool according to claim 4, wherein each said guide member includes a central portion which contacts said workpiece and bends to substantially conform to the shape of the workpiece, said end portions extending outwardly from said central portion toward said end portions of the tines.

9. A power cutting tool, comprising:
   a yoke including a base and spaced-apart side portions, each said side portion including a pair of spaced-apart tines;
   an axle extending between the side portions of the yoke, said axle having opposite end portions which are supported by the side portions of the yoke;
   a rotary cutting element mounted on said axle and including a cutting edge;
   a drive motor including a rotary output operably connected to said cutting element;
   said tines including end portions which are positioned outwardly of the cutting edge of the cutting element; and
   a pair of yieldable guide members, each said guide member extending between the end portions of a pair of said tines, said guide members being positioned to make contact with spaced-apart portions of an elongated article to be cut at a position outwardly of the cutting edge; and
   said yieldable members being yieldable to an extent sufficient to permit movement of the cutting edge relatively toward and into cutting engagement with said elongated article while contact is maintained between the guide members and the elongated article.

10. The power cutting tool according to claim 9, wherein said cutting element is positionable relative to said yoke to provide an oblique cutting engagement between said cutting edge and said elongated article.

11. The power cutting tool according to claim 10, wherein each said end portion of said axle is supported by a floating bearing, each said floating bearing being slidably situated in one of a pair of opposite transversely elongated slots formed in said opposite side portions of said yoke, said axle and said rotary cutting element mounted thereon being adjustably positionable relative to said yoke by slidably positioning said floating bearings along said elongated slots.

12. The power cutting tool according to claim 11, wherein said floating bearings each include a ball bushing having a bore through which one end portion of said axle extends, each said ball bushing being captured within a socket and each side socket being slidable along one of said transversely elongated slots.

13. The power cutting tool according to claim 9, wherein each said guide member includes a central portion which contacts said workpiece and bends to substantially conform to the shape of the workpiece, and further including end portions which extend outwardly from said central portion substantially toward said end portions of said tines.

14. The power cutting tool according to claim 9, wherein said drive motor includes a battery-powered electric motor.

* * * * *